United States Patent
Mitsui (10) Patent No.: US 7,668,373 B2
(45) Date of Patent: Feb. 23, 2010

(54) PATTERN EVALUATION METHOD, METHOD OF MANUFACTURING SEMICONDUCTOR, PROGRAM AND PATTERN EVALUATION APPARATUS

(75) Inventor: Tadashi Mitsui, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 776 days.

(21) Appl. No.: 11/192,043

(22) Filed: Jul. 29, 2005

(65) Prior Publication Data

US 2006/0023933 A1 Feb. 2, 2006

(30) Foreign Application Priority Data

Jul. 30, 2004 (JP) .............................. 2004-223511

(51) Int. Cl.
*G06K 9/00* (2006.01)

(52) U.S. Cl. ..................................... 382/181

(58) Field of Classification Search ................. 345/469; 382/181, 242
See application file for complete search history.

(56) References Cited

U.S. PATENT DOCUMENTS

| 4,790,564 A | 12/1988 | Larcher et al. |
| 5,621,849 A | 4/1997 | Sakurai et al. |
| 5,750,990 A | 5/1998 | Mizuno et al. |
| 6,185,318 B1 | 2/2001 | Jain et al. |
| 6,480,807 B1 | 11/2002 | Miyano |
| 6,772,089 B2 | 8/2004 | Ikeda et al. |
| 2004/0090437 A1* | 5/2004 | Uesaki et al. ............... 345/420 |

FOREIGN PATENT DOCUMENTS

| JP | 6-274613 | 9/1994 |
| JP | 8-82515 | 3/1996 |
| JP | 9-184714 | 7/1997 |
| JP | 11-306372 | 11/1999 |
| JP | 2000-171230 | 6/2000 |
| JP | 2001-052039 | 2/2001 |
| JP | 2004-101503 | 4/2004 |

OTHER PUBLICATIONS

Notification of Reason for Rejection issued by the Japanese Patent Office on Sep. 19, 2008, for Japanese Patent Application No. 2004-223511, and English-language translation thereof.
Notification of Reasons for Rejection issued by the Japanese Patent Office on Jan. 30, 2009, in counterpart Japanese Application No. 2004-223511 and English translation thereof.

* cited by examiner

*Primary Examiner*—Andrew W Johns
*Assistant Examiner*—Gregory F Cunningham
(74) *Attorney, Agent, or Firm*—Finnegan, Henderson, Farabow, Garrett & Dunner, L.L.P.

(57) ABSTRACT

A pattern evaluation method includes: acquiring an image of a pattern to be evaluated, detecting edge points of the pattern from the image, creating a parameter curve having the detected edge points as control points thereof, and evaluating the pattern based on the created parameter curve.

12 Claims, 6 Drawing Sheets

PATTERN EVALUATION METHOD, METHOD OF MANUFACTURING SEMICONDUCTOR, PROGRAM AND PATTERN EVALUATION APPARATUS

CROSS REFERENCE TO RELATED APPLICATIONS

This application claims benefit of priority under 35USC §119 to Japanese Patent Application No. 2004-223511, filed on Jul. 30, 2004, the contents of which are incorporated by reference herein.

BACKGROUND OF THE INVENTION

1. Field of the Invention

The present invention relates to a pattern evaluation method, a method of manufacturing a semiconductor device, a program and a pattern evaluation apparatus.

2. Related Art

By way of example, a conventional pattern evaluation will be described in the context of evaluation of a micropattern on a semiconductor. However, the present invention is not limited to the field of semiconductor pattern, but provides a new technique for measuring pattern dimensions and shape in various industries, including for example evaluation of a glass substrate such as a photomask.

For a semiconductor device manufacturing process, it is important to evaluate dimensions of a micropattern formed by a photolithography process, etching process, etc. Generally, CD-SEM (Critical Dimension Scanning Electron Microscope) is used to measure and evaluate pattern dimensions (e.g. the line width of a line pattern, the bore diameter of a hole pattern, etc.). CD-SEM measures pattern dimensions or the like by capturing secondary electrons at a detector, which is generated by irradiation of a primary electron beam into a pattern, and performing a predetermined image processing for the SEM image of the pattern that is obtained as the signal intensity of the secondary electrons. This will be described below in the context of the determination of the line width of a line pattern.

First, the scanning line direction of an electron beam is determined to be perpendicular to the line pattern to obtain the SEM image. Then a portion is cut from the SEM image according to a region of interest (ROI) described by a measurement recipe or specified by an operator, and for example, stored in an image memory in a computer running an image processing. Assuming that X direction is the scanning line direction of the electron beam in the ROI, an intensity value for each line pixel is detected to make a line profile, from which required edge points (in this case, two edge points at left-hand and right-hand sides) are detected by for example, the threshold method. Taking the distance between these edge points (the difference of X coordinates) as the width of the line pixel in the line pattern, the line pattern width is calculated for each line pixel. The average value of the resulting values over ROI's length direction (Y direction) is output as the line pattern width. Also, in order to remove a variation of computation values due to image noise, a value can be determined by averaging for example, over three line pixels including upper and lower line pixel, then the resulting value can be considered as the width of the line pixel. Further, the value which is obtained from averaging the value over ROI's length direction can be finally output as the width of the line pattern.

In this way, in the case of measuring pattern dimensions, following two steps are required as a image process: first, the procedure of detecting edge points using an edge point detection algorithm, then the pattern dimensions is calculated from coordinates of the detected edge points by a CD measurement algorithm meeting with the object of the measurement. In these steps, the maximum slope method or the like has been proposed as the edge points detection algorithm, in addition to the threshold method and the line approximation method (e.g. see Japanese Laid Open 09(1997)-184714).

As the CD measurement algorithm, in addition to simple methods such as using the average distance in the direction of X axis between edge points, or calculating the maximum and minimum distance between edge points as the maximum and minimum line width respectively in the case of a line pattern whose width is not constant, there are also more complex methods such as those proposed in Japanese Laid Open 2000-171230.

In addition to these methods of measuring a pattern directly from edge points, there is also another method in which a profile of a pattern is represented by some means, and measurement of the pattern profile is used in place of the pattern measurement. For example, in the case of measuring a hole pattern, a technique has been proposed in which an approximation circle is calculated from the resulting edge points, and the diameter of the calculated approximation circle is used in place of the diameter of the hole pattern. Further, as with the case of an OPC profile of a reticule in order to evaluate a more complex pattern, it has been proposed that edge points is connected in string so that the edge points is represented as a polygon curve.

However, in the method in which edge points is connected in string so that the edge points is represented as a polygon curve, since an actual pattern profile is approximated as an unnatural profile line, an inaccurate measurement has been obtained especially if the number of edge points is small. Therefore, among the values representing characteristics of a pattern shape (hereinafter referred to as "characteristic values"), especially the characteristic values associated with pattern profile such as a rounding of a turn corner portion or the roughness of a pattern for example could not measure accurately. On the other hand, in the case of large number of edge points, handling with a computer was difficult due to the increase of CPU (Central Processing Unit) load in the processing computer.

SUMMARY OF THE INVENTION

According to a first aspect of the present invention, there is provided a pattern evaluation method comprising: acquiring an image of a pattern to be evaluated; detecting edge points of the pattern from the image; creating a parameter curve having the detected edge points as control points thereof; and evaluating the pattern based on the created parameter curve.

According to a second aspect of the present invention, there is provided a program to cause a computer to perform a pattern evaluation method, the pattern evaluation method comprising: acquiring an image of a pattern to be evaluated; detecting edge points of the pattern from the image; creating a parameter curve having the detected edge points as control points thereof; and evaluating the pattern based on the created parameter curve.

According to a third aspect of the present invention, there is provided a method of manufacturing a semiconductor device, comprising: extracting arbitrary semiconductor substrate from a manufacturing lot of semiconductor substrates, a pattern being formed on the semiconductor substrate; acquiring an image of the pattern on the extracted semiconductor substrate; detecting edge points of the pattern from the image; creating a parameter curve having the edge points as control points thereof; evaluating the pattern based on the created parameter curve; and If the pattern is evaluated as being non-defective, manufacturing the semiconductor device on the semiconductor substrates of the manufacturing lot to which the evaluated semiconductor substrate belongs.

According to a fourth aspect of the present invention, there is provided a pattern evaluation apparatus comprising: an edge point detector which receives image data of the pattern to be evaluated to detect edge points of the pattern; a parameter curve creation unit which creates a parameter curve having the detected edge points as control points thereof; and an evaluation unit which evaluates the pattern based on the created parameter curve.

According to a fifth aspect of the present invention, there is provided a pattern evaluation apparatus comprising: an edge point detector which receives image data of the pattern to be evaluated to detect edge points of the pattern; a parameter curve creation unit which creates a parameter curve having the detected edge points as control points thereof; and a sampling unit which samples the created parameter curve to outputting the sampling result as coordinates of vertices to draw a polygon.

DETAILED DESCRIPTION OF THE INVENTION

Some embodiments of the present invention will be described below with reference to the drawings. The same reference numbers are used throughout the figures below to reference the same potions, and those will not be repeatedly described unless it is needed.

(1) First Embodiment of Pattern Evaluation Apparatus

Figure 1:
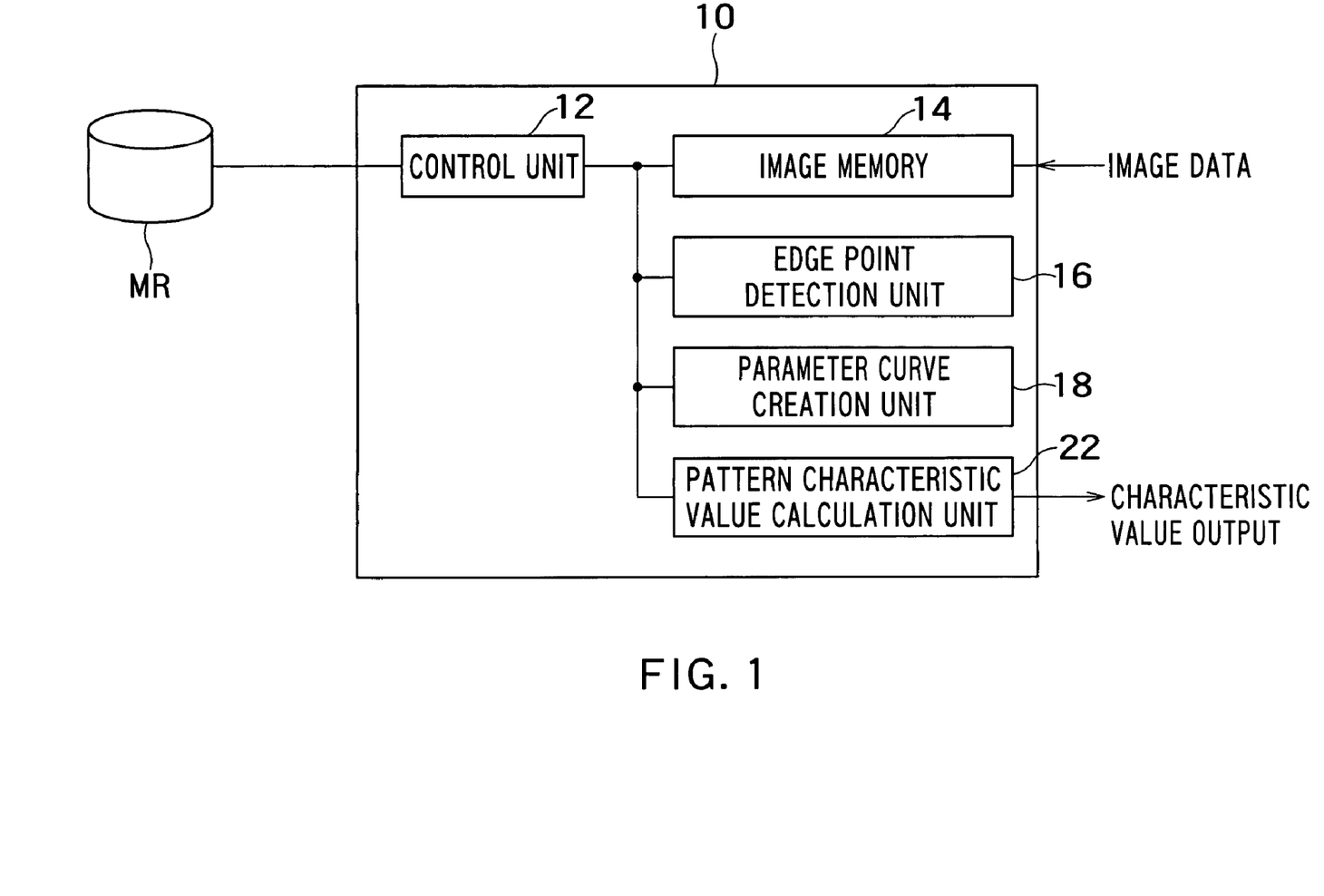
FIG. 1 is a block diagram showing a schematic arrangement of a first embodiment of a pattern evaluation apparatus according to the present invention.

FIG. 1 is a block diagram showing a schematic arrangement of a first embodiment of a pattern evaluation apparatus according to the present invention. The pattern evaluation apparatus shown in FIG. 1 comprises a computer 10 which can perform image processing, and a storage device MR which is connected to the computer 10 and removable.

The computer 10 includes an image memory 14, an edge point detection unit 16, a parameter curve creation unit 18 which is specific to the embodiment, a pattern characteristic value calculation unit 22 and a control unit 12 which is commonly connected to each processing unit and also connected to the storage device MR to control the entire apparatus.

The image memory 14 receives image data to be evaluated from outside of the apparatus to store it. The edge point detection unit 16 retrieves image data from the image memory 14 to detect edge points in the pattern using a known method to provide it to the edge point detector 16. The parameter curve creation unit uses the pattern edge point data provided by the edge point detector 16 to create a parameter curve (approximation curve) with the edge points as control points thereof to provide it to the pattern characteristic value calculation unit 22. The pattern characteristic value calculation unit 22 calculates and output the characteristic value of the pattern from the given parameter curve.

The storage device MR has a plurality of storage area, and stores in the form of recipe file a program causing the computer 10 to execute an evaluation method described below as well as stores a CG (Computer Graphics) program to make a parameter curve.

Figure 2:
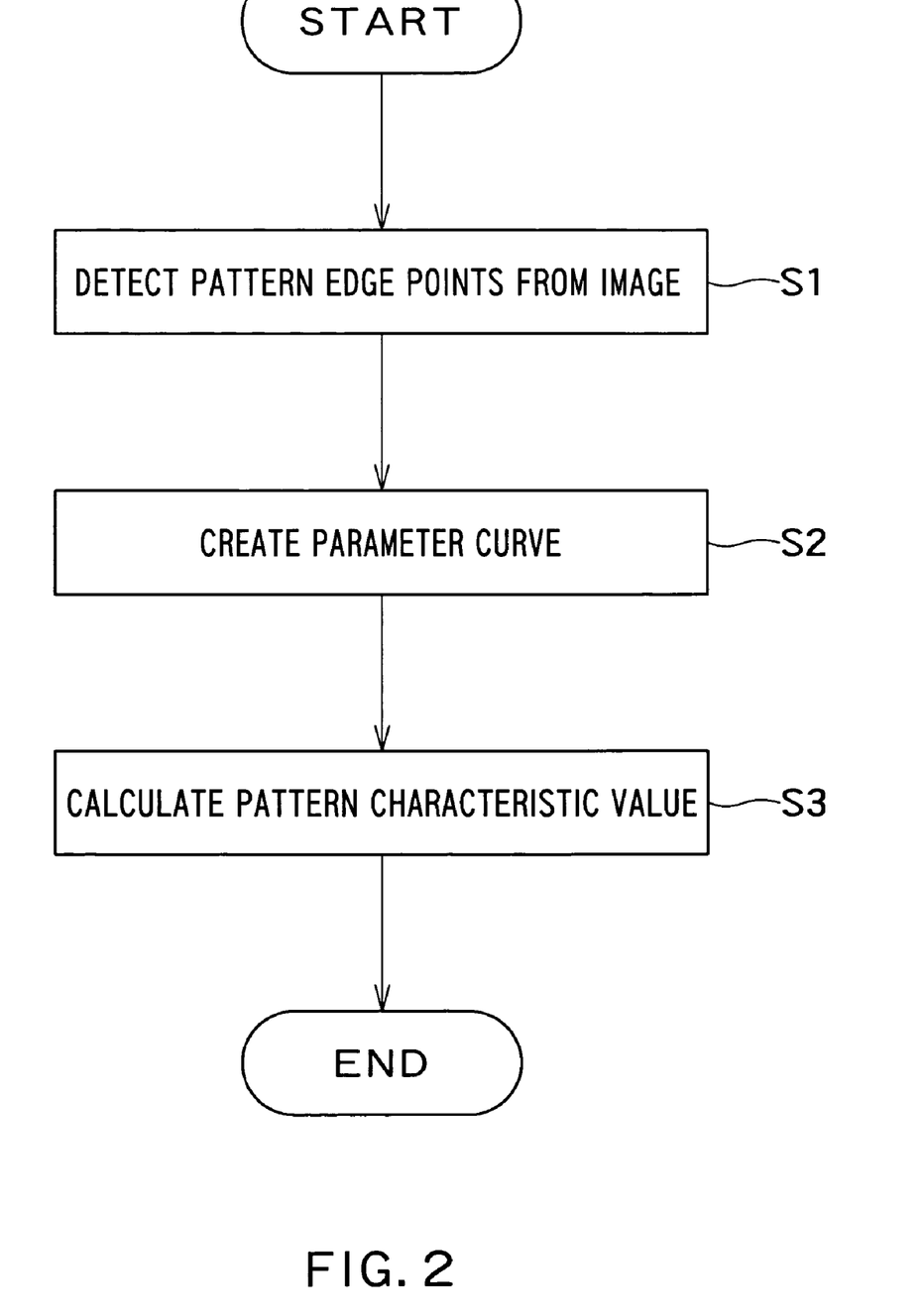
FIG. 2 is a flow diagram showing a schematic procedure of the first embodiment of the pattern evaluation apparatus according to the present invention.
Figure 3:
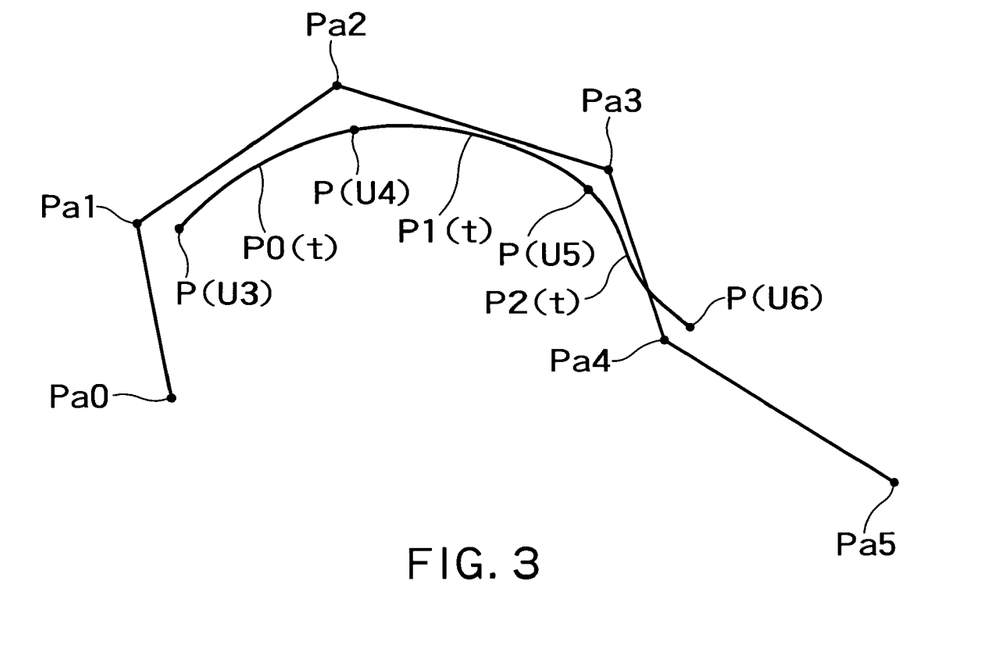
FIG. 3 is an example of a parameter curve.
Figure 4:
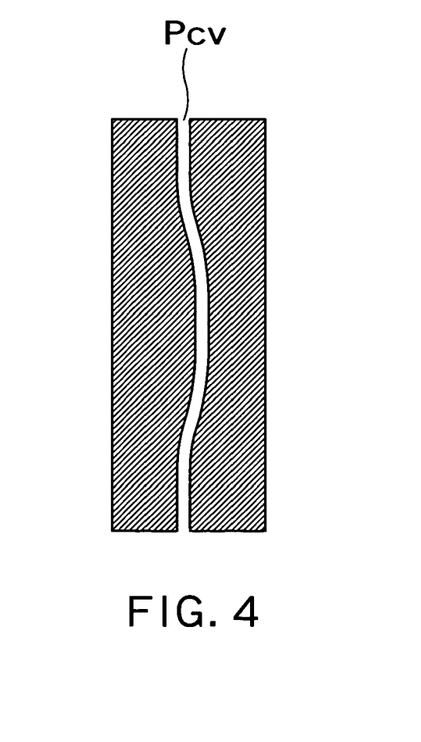
FIG. 4 is an example of a line pattern having curvature.

With reference to FIGS. 2 to 4, the operation of the pattern evaluation apparatus shown in FIG. 1 will be described as a first and second embodiments of the pattern evaluation method according to the present invention.

(2) First Embodiment of Pattern Evaluation Method

FIG. 2 is a flow diagram showing a schematic procedure of the first embodiment of the pattern evaluation method according to the present invention. Here, as an example, consider the case of measuring the roughness of a line pattern.

First, an image of a pattern to be evaluated is acquired, from which a pattern edge points is detected (step S1). Any known method can be used as an edge point detection method. For example, if the pattern image is acquired by a SEM (Scanning Electron Microscope), then a SEM image is cut from a preset ROI (Region of Interest), and with respect to intensity (line profile) of the ROI, the threshold method can be applied. Other various methods can be used as a profile detection method, and of course the present invention can be applied to edge points detected by any method.

Then, the obtained edge points are grouped for each profile line and labeling process is performed. For a line pattern in this embodiment, assuming that the length direction of the line pattern is the vertical direction of ROI, edge points is grouped into two edge point groups each belonging to left and right profile line. Then, for each edge point group, polygon process is performed. That is, for each group, a polygon is created by connecting edge points belonging to that group in string. Here, it is noted that a single edge point group corresponds to a single polygon, and edge points needs to be connected such that there is no local closed loop. Although such graphic creation process likely to overload a CPU, polygon process can be easily performed in this embodiment since the edge points has been previously detected for each line pixel of the SEM image. In this procedure, it is important to number the edge points consecutively by polygonization.

Next, a parameter curve is created by defining the edge points numbered consecutively by the above procedure as control points (step S2).

FIG. 3 shows an example of the parameter curve. The parameter curve refers to the curve represented by an explicit function of a parameter, and as shown in FIG. 3, the parameter has the value that is zero at a starting point and one at an end point, the shape of the curve can be represented by changing the parameter. If the function is a polynomial function or a rational function, then it is called as a polynomial curve or rational curve respectively. A quadric curve can also be represented by a parameter curve of a polynomial or a rational formula. For example, in the case of a parabola, it can be represented by a polynomial curve as:

$$x=t, y=at^2 \quad \text{[Formula 1]}$$

In the case of an ellipse, it can be represented by:

[Formula 2]

$$x = \frac{a(t^2-1)}{t^2+1}, y = \frac{2bt}{t^2-1}$$

Further, in the case of a hyperbola, it can be represented by a rational curve as:

[Formula 3]

$$x = \frac{a(t^2+1)}{t^2-1}, y = \frac{2bt}{t^2-1}$$

Generally, following curves are widely used as design tools for industrial design such as CAD/CAM:

1) Hermite curve
2) Bezier curve
3) Rational Bezier curve
4) B-spline curve
5) Non uniform rational B-spline (NURBS) curve Among these curves, rational curve is those whose definition is extended such that control points can have weight parameters. Since NURBS curve is originally defined as a curve including the parameter curve described above, NURBS curve can also be considered as including all the above-mentioned parameter curves. Non-rational curve can also be considered as rational curve having weight at each control point of 1. In fact, Bezier curve exists as a special case where weights at all the control points equal 1 and a knot vector uniformly increases (spaced uniformly). One important difference between NURBS curve and Bezier curve is whether conic section can be represented, thus, in the field of CAD and CG, NURBS curve is adopted which can also represent conic section precisely. However, in this embodiment, focusing on the advantage of shorter computation time rather than the disadvantage that conic section can not be precisely represented, Bezier curve is adopted as a parameter curve. The manner in which rational curve is handled will be described in the second embodiment below.

Bezier curve is often used for outline font representing character profile lines as mathematical expression. Representative features of Bezier curve are listed below.

1) Convex closure property: a curve in section $t\in[0, 1]$ exists within the convex closure comprised of the control points.

2) Variational diminishing property: a curve is formed by connecting the sequence of the control points smoothly.

3) Pseudo-local contollability: if a control point is moved, a portion of a curve corresponding to the control point becomes deformed greatly.

4) Line reproducibility: if control points are located on a straight line, the curve becomes a straight line 5) Affine invariance: the result obtained from performing affine transformation against a curve is equal to a curve obtained from control points performed by affine transformation.

Among the above features, feature 1) needs to be noted in the case of measuring a hole pattern, but generally, edge points of a hole pattern is not convex closure, and the error due to convex closure property can be reduced by detecting large number of edge points.

In order to create Bezier line, in addition to coordinates and the number n+1 of control points given as a polygon curve, the order k of a basis function and a B-spline Basis Function is needed as elements. Although these can be specified by a user, it is assumed in this embodiment that the order of three has been preset by software, since the order of three is generally sufficient for controlling the smoothness of curve. Since the method to create a Bezier curve from this required information is described in many references, the detailed description is omitted in this embodiment.

Finally, defining the profile line of the pattern to be evaluated as the resulting parameter curve, a measurement of the pattern shape is performed (step S3). More specifically, the distances are determined between the profile line defined by the parameter line and each control point to calculate the average value of these distances. The average value corresponds to the variance of the edge points in the case of considering Bezier curve to be a reference profile line, and is considered as the value associated to the micro roughness of the pattern. Conventionally, the roughness has been measured based on an approximation line. However, except for a really straight line pattern, that is, in a line pattern having curvature such as a pattern Pcv shown in FIG. 4, precise roughness could not measured. According to the evaluation method in this embodiment, the roughness of any shape pattern can be measured.

(3) Second Embodiment of Pattern Evaluation Method

The second embodiment of the pattern evaluation method according to the present invention will be described in the case of measuring the roughness of a hole pattern. In the description below, edge points of a hole pattern is used which is detected using matching with edge. Of course, another method can be used as method to detect an edge point.

Traditionally, in order to measure from the detected edge points a characteristic value of a hole pattern such as radius, it has been used that approximation circle is calculated from a sequence of the edge points so that the characteristic value of the approximation circle is used in place of the evaluation result of the hole pattern. This embodiment also uses non uniform rational B-spline curve as a parameter curve representing the profile curve of the hole pattern. Non uniform rational B-spline curve is represented by following elements.

1) Coordinates and the number n+1 of control points
2) Weights of control points
3) The order k of basis function, B-spline Basis Function
4) The number of segments divided by knots Where knot vector is simply a sequence denoting where segments is divided, and is categorized as three types shown blow.

a) Periodic/Uniform: for example, in the case of n=3, k=3, [0 1 2 3 4 5 6]

b) Non Periodic: for example, in the case of n=3, k=3, [0 0 0 1 2 2 2]

c) Non Uniform: case of so-called non uniform rational B-spline curve, for example, [0 0 0 1 2 5 5]

Figure 5:
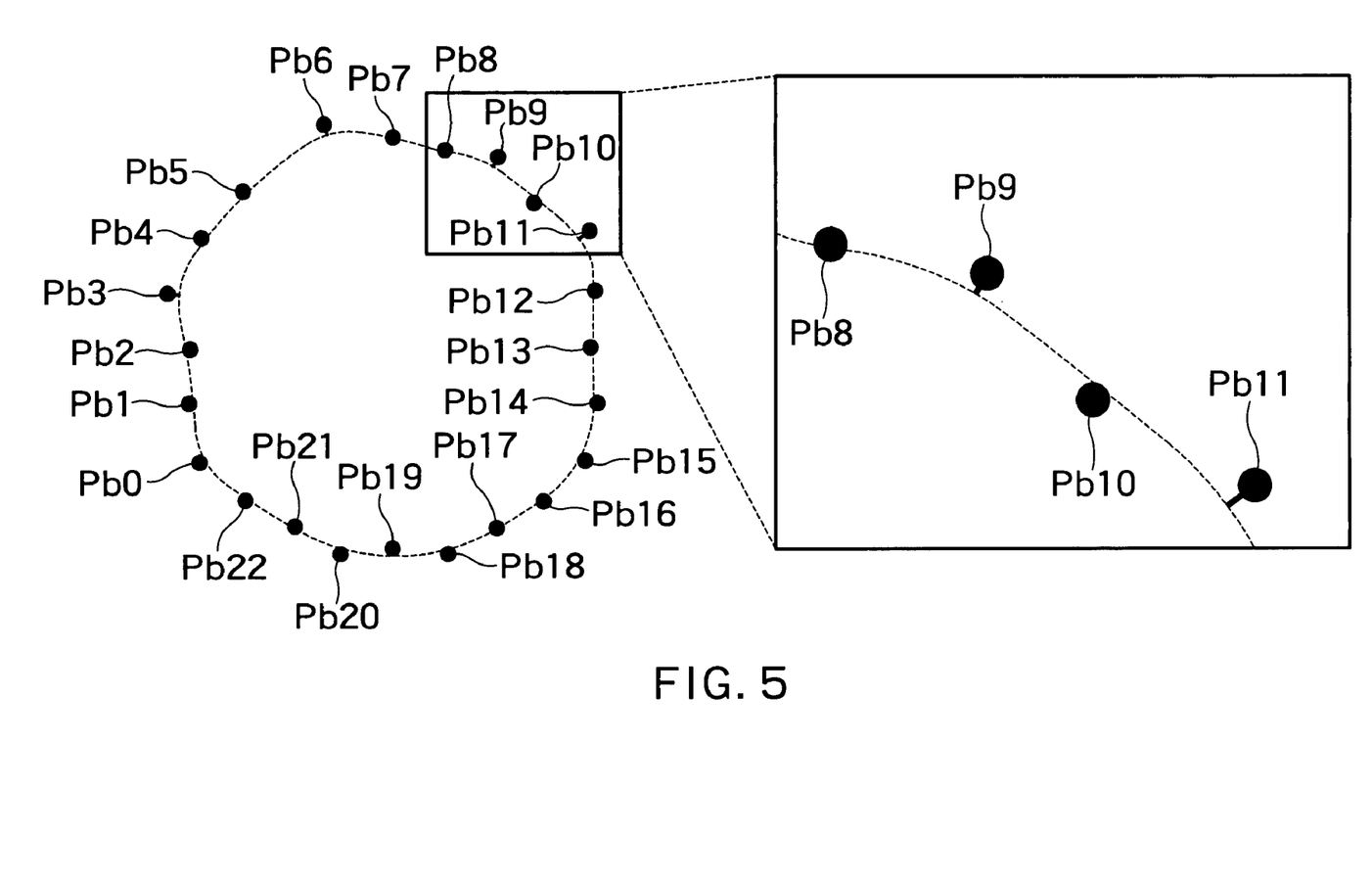
FIG. 5 is an example of a profile line of a hole pattern obtained from the second embodiment of the pattern evaluation method according to the present invention.

As weights of control points, the value which is proportional to the characteristic value of the edge points is used. In this embodiment, the value is used which is proportional to the matching score obtained from detection of the edge points. Although linear expression multiplied by simple coefficient is used as proportional expression in this embodiment, another proportional relation can also be used. An example of a hole pattern obtained in this way is shown in FIG. 5. From this profile line, the roughness of the pattern can be determined by a similar procedure as embodiment 1. Also, since profile line is given by mathematical expression, characteristic values of the pattern such as local curvature, area and circumference can be calculated precisely and quickly.

In this manner, representing a profile line as a parameter curve in mathematical expression has the advantages shown blow.

1. Characteristic values associated with the nature of a profile line can be readily calculated. Typical characteristic values include local curvature, area, circumference, etc.

2. Profile line data can be easily stored. Therefore, resources of storage medium for data storage can be reduced, and further, resources of CPU for data storage and reading (including CRT display for profile lines) can be reduced.

3. Since a profile line is represented as a parameter curve, accuracy of profile lines is not changed with scale-up and scale-down.

(4) Second Embodiment of Pattern Evaluation Apparatus

Figure 6:
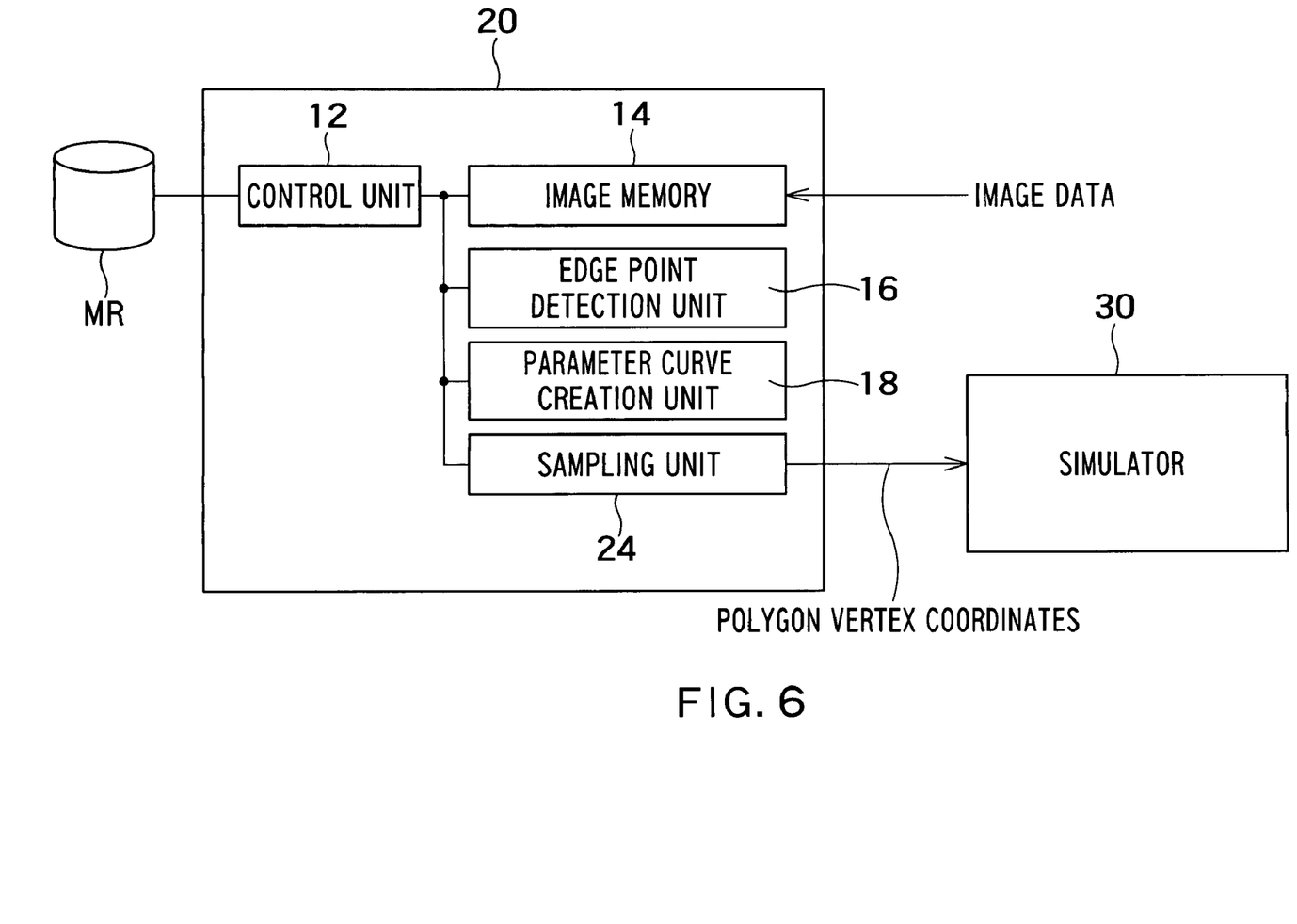
FIG. 6 is a block diagram showing a schematic arrangement of the second embodiment of the pattern evaluation apparatus according to the present invention.

FIG. 6 is a block diagram showing a schematic arrangement of the second embodiment of the pattern evaluation apparatus according to the present invention. The pattern evaluation apparatus shown in FIG. 6 comprises a sampling unit 24 in place of the pattern characteristic value calculation unit 22 shown in FIG. 1. The other components in this embodiment are substantially identical to the pattern evaluation apparatus shown in FIG. 1.

Figure 7:
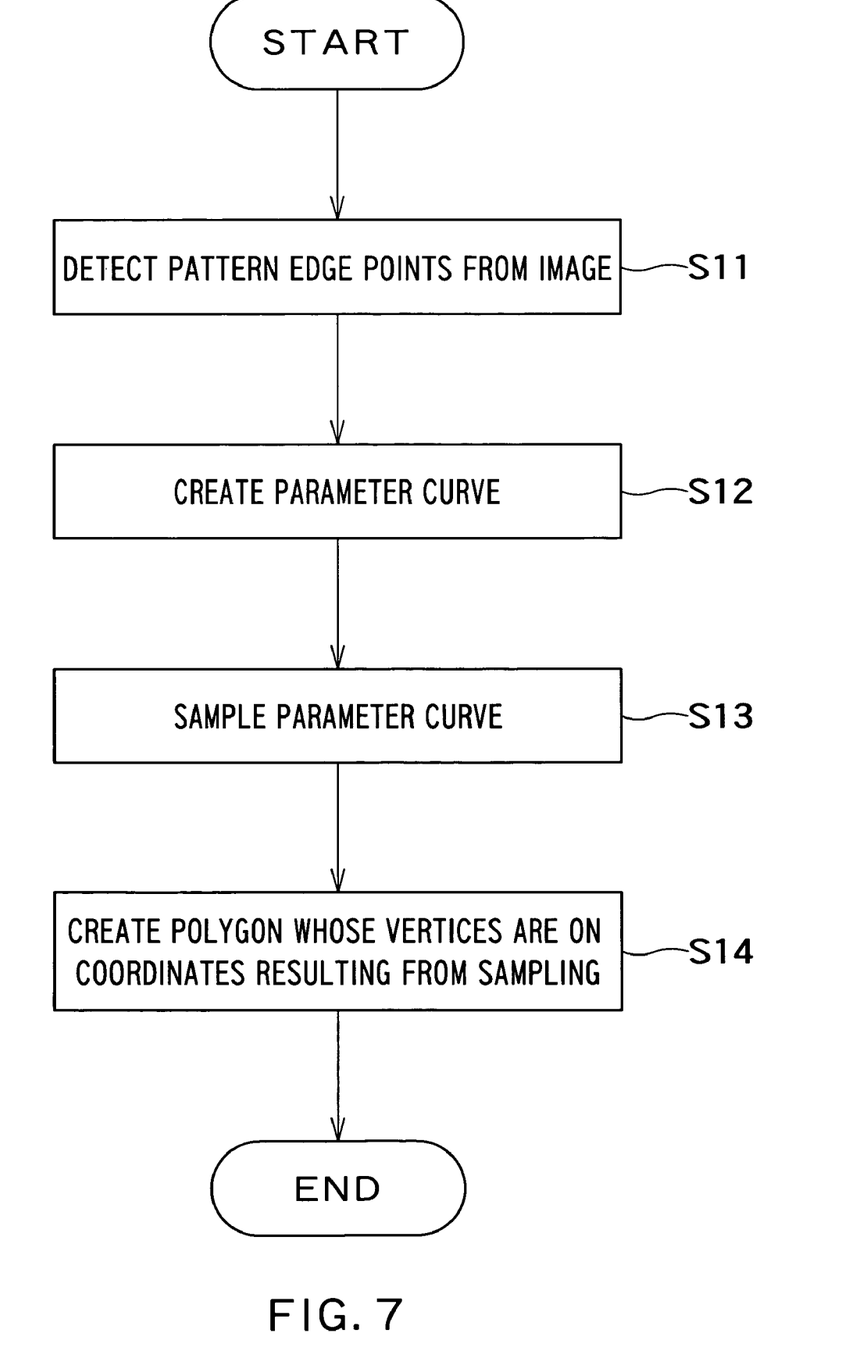
FIG. 7 is a flow diagram showing a schematic procedure of a third embodiment of the pattern evaluation method according to the present invention.

The sampling unit 24 performs sampling of coordinates constituting the parameter curve created by the parameter curve creation unit 18, and supplies it to an external simulator 30. Starting from any point on the parameter curve, sampling is performed at arbitrary interval. Using the coordinate data supplied from the sampling unit 24, a simulator 30 creates polygon whose vertices are on these coordinates and performs various simulations. With reference to FIG. 7, the operation of the pattern evaluation apparatus shown in FIG. 6 will be described as a third embodiment of a pattern evaluation method according to the present invention.

(5) Third Embodiment of Pattern Evaluation Method

FIG. 7 is a flow chart showing a schematic procedure of a pattern evaluation method according to this embodiment. The pattern evaluation procedure described below is stored in the storage device MR in the form of recipe file.

First, the control unit 12 in the pattern evaluation apparatus in FIG. 6 reads the content of the recipe file, and stores it in a buffer memory (not shown). Next, the image of the pattern to be evaluated is incorporated from an external imaging device (not shown) into the image memory 14. Subsequently, similar to the first embodiment of the pattern evaluated method described above, the edge points is detected from the image of the pattern to be evaluated (step S11), and using the coordinates of the edge points, the parameter curve creation unit 18 creates the parameter curve approximating the pattern to be evaluated (step S12).

Further, the sampling unit 24 performs sampling of the parameter curve created by the parameter curve creation unit 18 (step S13). At this point, the sampling interval is varied as a function of local curvature of the parameter curve. For example, sampling is made such that greater curvature results in smaller interval. This allows creating more precise polygon with respect to the original pattern by smaller number of vertices.

Finally, using the coordinate data supplied from the sampling unit 24, simulator 30 creates polygon whose vertices are on these coordinates (step S14) and performs various simulations.

In this manner, according to this embodiment, since the coordinate data is output which is sampled such that the interval is varied as function of local curvature, more precise pattern can be represented by smaller data. This allows to significantly reduce computation time and CPU cost if the pattern is subject to various computer simulations for example, and also to obtain more precise simulation result.

(6) Program and Storage Medium

The series of procedures in the pattern evaluation method described above can also be incorporated into a program, causing a computer which can perform image processing to read and execute it. This allows the pattern evaluated method according to the present invention to be achieved using a general purpose computer. The series of procedures in the pattern evaluation method described above can also be stored as the program to be executed by a computer in a recording medium such as a flexible disk or CD-ROM, causing the computer to read and execute it.

The recording medium is not limited to a portable disk such as a magnetic or optical disk, but can also be a fixed recording medium such as a hard disk device or memory. Also, a program incorporating the series of procedures in the pattern evaluation method described above can be distributed over a communication line such as Internet. Further, a program incorporating the series of procedures in the pattern evaluation method described above can be in a state of being encrypted, modulated or compressed distributed over a wired line such as Internet or a wireless line, or over a recording medium storing it.

(7) Manufacturing Method of Semiconductor Device

Manufacturing a semiconductor device in a process including a low cost and high accuracy inspection process using the pattern evaluation method described above makes it possible to manufacture the semiconductor device in high throughput and yield.

More specifically, a semiconductor substrate is extracted per manufacturing lot, and the pattern formed on the extracted semiconductor substrate is inspected by the pattern evaluation method described above. As a result of the inspection, if it is determined that the semiconductor substrate is non-defective, remaining manufacturing processes is performed for the entire manufacturing lot to which the inspected semiconductor substrate belongs. Otherwise, if it is determined that the semiconductor substrate is defective, a rework process is performed for the entire manufacturing lot to which the defective semiconductor substrate belongs. After finishing the rework process, an arbitrary semiconductor substrate is extracted from the manufacturing lot in order to be again inspected. If it is determined that the extracted semiconductor substrate is non-defective, remaining processes is performed for the manufacturing lot to which a rework process is finished.

Some embodiments of the present invention having been thus described, it is clear that the present invention is not limited to the above embodiments, but various modifications may be made thereto within the technical scope of the present invention. For example, while the above embodiments is described in the context of usage of a SEM image as an image of a pattern, it is clear that the present invention is not limited to such image, but may also apply to an optical microscopic image obtained from an optical imaging device.

What is claimed is:

1. A pattern evaluation method comprising:
    acquiring an image of a pattern to be evaluated using an imaging device;
    detecting edge points of the pattern from the image;
    creating a parameter curve represented by an explicit function of a parameter and having the detected edge points as control points thereof; and
    evaluating the pattern based on the created parameter curve,
    wherein the parameter curve is created in a manner so that weight of the control point is proportional to a value given to the detected edge point.

2. The pattern evaluation method according to claim 1, wherein the parameter curve includes at least one of a Hermite curve, a Bezier curve, a Rational Bezier curve, a B-spline curve and a Non uniform rational B-spline (NURBS) curve.

3. The pattern evaluation method according to claim 1, wherein a matching score obtained from detection of the edge points is used as the value given to the detected edge point.

4. The pattern evaluation method according to claim 1, wherein the parameter curve is a NURBS curve having uniform and evenly spaced knot vectors.

5. The pattern evaluation method according to claim 1, wherein evaluating the pattern includes measuring a characteristic value representing the characteristic of a shape of the pattern to be evaluated, and
    the characteristic value is measured by calculating a variance between the detected edge points and the created parameter curve.

6. A computer readable recording media containing a program to allow a computer to execute a pattern evaluation comprising:
    acquiring an image of a pattern to be evaluated using an imaging device;
    detecting edge points of the pattern from the image;
    creating a parameter curve represented by an explicit function of a parameter and having the detected edge points as control points thereof; and
    evaluating the pattern based on the created parameter curve,
    wherein the parameter curve is created in a manner so that weight of the control point is proportional to a value given to the detected edge point.

7. A method of manufacturing a semiconductor device, comprising:
    extracting arbitrary semiconductor substrate from a manufacturing lot of semiconductor substrates, a pattern being formed on the semiconductor substrate;
    acquiring an image of the pattern on the extracted semiconductor substrate using an imaging device;
    detecting edge points of the pattern from the image;
    creating a parameter curve represented by an explicit function of a parameter and having the edge points as control points thereof;
    evaluating the pattern based on the created parameter curve; and
    if the pattern is evaluated as being non-defective, manufacturing the semiconductor device on the semiconductor substrates of the manufacturing lot to which the evaluated semiconductor substrate belongs,
    wherein the parameter curve is created in a manner that weight of the control points is proportional to a value given to the detected edge point.

8. A pattern evaluation apparatus comprising:
    an edge point detector which receives image data of the pattern to be evaluated from an imaging device and detects edge points of the pattern;
    a parameter curve creation unit which creates a parameter curve having the detected edge points as control points thereof; and
    an evaluation unit which evaluates the pattern based on the created parameter curve,
    wherein the parameter curve creation unit creates the parameter curve in a manner so that weight of the control point is proportional to a value given to the detected edge point.

9. The pattern evaluation apparatus according to claim 8, wherein the parameter curve creation unit creates a Bezier curve as the parameter curve.

10. The pattern evaluation apparatus according to claim 8, wherein the parameter curve creation unit uses a matching score obtained from detection of the edge points is used as the value given to the detected edge point.

11. The pattern evaluation apparatus according to claim 8, wherein the parameter curve creation unit creates a NURBS curve having uniform and evenly spaced knot vectors as the parameter curve.

12. The pattern evaluation apparatus according to claim 8, wherein the evaluation unit measures a characteristic value representing the characteristic of the shape of a pattern to be evaluated by calculating a variance between the detected edge points and the created parameter curve.

* * * * *